US006766300B1

(12) United States Patent
Laroche

(10) Patent No.: US 6,766,300 B1
(45) Date of Patent: Jul. 20, 2004

(54) METHOD AND APPARATUS FOR TRANSIENT DETECTION AND NON-DISTORTION TIME SCALING

(75) Inventor: Jean Laroche, Santa Cruz, CA (US)

(73) Assignee: Creative Technology Ltd., Singapore (SG)

( * ) Notice: Subject to any disclaimer, the term of this patent is extended or adjusted under 35 U.S.C. 154(b) by 0 days.

(21) Appl. No.: 09/378,377

(22) Filed: Aug. 20, 1999

Related U.S. Application Data

(63) Continuation-in-part of application No. 08/745,929, filed on Nov. 7, 1996, now Pat. No. 6,049,766.
(60) Provisional application No. 60/117,154, filed on Jan. 25, 1999.

(51) Int. Cl.[7] .......... G01L 19/00
(52) U.S. Cl. .......... 704/500; 704/211
(58) Field of Search .......... 704/500, 503, 704/211, 225, 213, 216, 217, 218

(56) References Cited

U.S. PATENT DOCUMENTS 3,991,277 A * 11/1976 Hirata .......... 370/484
5,504,833 A * 4/1996 George et al. .......... 704/211
6,049,766 A * 4/2000 Laroche .......... 704/216
6,104,996 A * 8/2000 Yin .......... 704/500
6,453,282 B1 * 9/2002 Hilpert .......... 704/200.1

OTHER PUBLICATIONS

"Time–Frequency Analysis of Musical Signals." Pielemeier, William et al. Proceedings of the IEEE, vol. 84, No. 9, Sep. 1996.*
"Determination of the meter of musicl scores by autocorrelation," Brown, *J. Acoust. Soc. Am.* 94 (4) Oct. 1993.
"Tempo and beat analysis of acoustic musical signals," Scheirer, *J. Acoust. Soc. Am.*, 103 (1) Jan. 1998.
"Pulse Tracking with a Pitch Tracker," Scheirer, Machine Listening Group, MIT Medical Laboratory, Cambridge MA 02139, 1997.

* cited by examiner

*Primary Examiner*—Richemond Dorvil
*Assistant Examiner*—Kinari Patel
(74) *Attorney, Agent, or Firm*—Blakely, Sokoloff, Taylor & Zafman LLP

(57) ABSTRACT

A method and apparatus for transient detection and time-scaling an audio signal detects transients and scales only intervals located between transients to avoid artifacts. In one embodiment, the transient detection process compares frequency characteristic energy between succeeding windows of the audio signal and calculates values of an energy curve where the energy increases. Transients are detected at maxima of the energy curve.

14 Claims, 5 Drawing Sheets

METHOD AND APPARATUS FOR TRANSIENT DETECTION AND NON-DISTORTION TIME SCALING

CROSS-REFERENCE TO RELATED APPLICATION

This application is a continuation-in-part of application Ser. No. 08/745,929, filed Nov. 7, 1996, entitled "Time-Domain Time/Pitch Scaling of Speech or Audio Signal," assigned to the assignee herein, the disclosure of which is incorporated herein by reference. Application Ser. No. 08/745,929 was issued as U.S. Pat. No. 6,049,766 on Apr. 11, 2000.

This application claims priority from provisional application Serial No. 60/117,154, filed Jan. 25, 1999, entitled "Beat Synchronous Audio Processing," the disclosure of which is incorporated herein by reference.

BACKGROUND OF THE INVENTION

This invention relates to the field of audio signal processing and more specifically, musical signal processing. Time-scaling consists of shortening or lengthening an audio signal while keeping its pitch unchanged. Time-scaling is crucial in many audio applications (e.g. video/audio post-synchronization), and has found its way into several consumer products such as answering systems or voice mail systems. Because they require much less computation power, time-domain techniques are often preferred over frequency-domain techniques, see for example J. Laroche, "Time and pitch scale modification of audio signals" in *Applications of Digital Signal Processing to Audio and Acoustics*, M. Kahrs and K. Brandenburg, editors, Kluwer, Norwell, Mass., 1998.

For time-domain time scaling techniques, one problem that needed to be solved is the following: time-domain time-scaling systems rely on the very simple idea of repeating (respectively, discarding) segments of the original audio to increase (respectively, decrease) its duration without altering its pitch, a process known as "splicing." When the segments are of an appropriate duration and the splice points are appropriately chosen, the operation of repeating or discarding audio segments can be made relatively inconspicuous, at least for moderate (15%) modification factors. However, two kinds of artifacts are particularly troublesome and difficult to avoid: tempo-modulation and transient-repeating/discarding.

The first artifact, tempo-modulation, comes from the fact that, as the length of the repeated/discarded segments grows larger, the uniformity of tempo in the unmodified signal is lost in the time-scaled signal. For example, a series of metronome clicks becomes irregular after time-scaling, an artifact particularly undesirable for rhythmic music, where tempo accuracy is essential. Reducing the duration of the repeated/discarded segments helps reduce this problem. Unfortunately, as the duration of the repeated/discarded segments becomes smaller, other types of artifacts come into play, such as warbling (an undesirable tremolo heard in sustained pitched sounds). Moreover, for pitched sounds, the length of the repeated/discarded segments should ideally be a multiple of the pitch period (to avoid warbling artifacts), which makes it impossible to make the segments arbitrarily small, and therefore prevents us from reducing tempo-modulation to an acceptable level.

The second artifact, transient-repeating/discarding, comes from the fact that some repeated/discarded segments might fall in the vicinity of a transient (a piano onset or a drum hit) in the original signal. As a result, this transient will be heard as a pair of closely spaced transients if the signal is time-stretched, a very undesirable artifact, or might altogether disappear if the signal is time-compressed. Using short segment durations helps reduce this problem, but cannot entirely avoid it.

By comparison, frequency-domain techniques do not exhibit the problem of tempo-modulation because the time-scaling operation is uniformly distributed along the duration of the signal (as opposed to lumped at certain splicing-instants in time-domain techniques). However, they exhibit a problem similar to transient-repeating/discarding, usually referred to as "transient-smearing." Percussive transients in frequency-domain time-scaled signals become smeared in time and lose their original sharpness.

SUMMARY OF THE INVENTION

According to one aspect of the invention, it possible to perform time-scaling on an audio signal while alleviating most of the artifacts encountered in standard time-scaling techniques. The process according to one aspect is based on a preliminary transient-detection stage and solves all the above problems at the same time. Because the transient locations are known in advance, it becomes possible to control with an arbitrary degree of accuracy where the transients will fall in the time-scaled signal, thus entirely avoiding the problem of tempo-modulation. Furthermore, it becomes possible to "protect" the transients by defining a small area around each transient and making sure that repeated/discarded segments will not overlap with these protected areas in time-domain techniques, or that no time-scaling is performed on the protected areas in frequency-domain techniques.

According to a further aspect of the invention, transients in an audio signal are determined by comparing frequency characteristic energy for different windows of the audio signal. A level curve has values indicating increasing energy in succeeding windows. Peaks on the level curve indicate transients.

According to another aspect of the invention, time scaling is performed only on intervals located between transients. This time scaling may be performed in the time or frequency domains.

According to a further aspect of the invention, in time-domain processing splicing is performed on an interval between transients to modify the length of the interval.

According to a further aspect of the invention, in frequency-domain processing protected areas around each transient are subtracted from an interval between transients and a modified scaling factor is calculated to be used during frequency-domain processing.

Other features and advantages will be apparent in view of the following detailed description and appended claims.

DETAILED DESCRIPTION OF THE PREFERRED EMBODIMENTS

Figure 1:
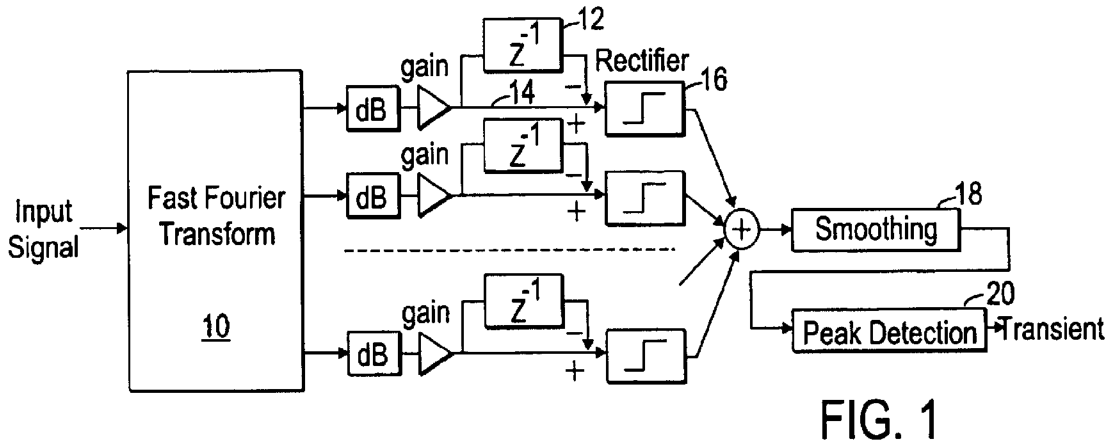
FIG. 1 is a block diagram of the frequency-domain transient detection process.

In a preferred embodiment, an audio signal time-scaling procedure is utilized that works in two successive stages: a transient-detection stage followed by the actual time-scaling operation. FIG. 1 presents the overall structure of the transient-detection algorithm. This transient-detection stage aims at detecting transients in an audio signal. The signal might have been pre-recorded, in which case the whole signal can be scanned for transients, or might be recorded in real-time, in which case it is scanned on a buffer basis (e.g., a first buffer is first recorded and analyzed for transients, then the next buffer, and so on). Many techniques exist for the detection of transients in a signal, most of which are based on monitoring the RMS (root-mean-square or energy) level of the signal. See for example, J. Benson, *Audio Engineering Handbook*, McGraw-Hill, 1988. The embodiment described here is only one of many possibilities.

If the input frequency is high enough, downsampling may be used to reduce the computational cost of the algorithm. In practice, if the sampling rate is higher that 24 kHz, the signal can be downsampled by a factor 2 with no loss of precision on the transient location. The decrease in computational cost is far from negligible.

In FIG. 1, the transient detection algorithm is represented as a block diagram. A Fast Fourier Transform (FFT) module 10 performs FFTs on windows of the sampled audio signal. The output FFT bins from each window are input to a delay line 12 and direct line 14 and coupled to the input of a rectifier block 16. The outputs of all the rectifier blocks 16 for the different windows is input to a smoothing block 18. The output of the smoothing block 18 is coupled to a peak detection block 20, which outputs the times of the detected transients.

In a preferred embodiment, the functions of the blocks depicted in FIG. 1 are implemented in software. An FFT is calculated at regular time intervals (where the magnitude of the time intervals determine the granularity of the transient detector), for example, each 2 or 3 ms, on a windowed segment of the input signal. The duration of the window and the size of the Fourier transform are usually set to 3 to 5 ms, which gives uniform frequency bands of about 300 Hz. Note that a better sub-band decomposition could be used here, for example, one that would implement frequency bands uniform in a bark-scale. At 22 kHz sampling rate, the FFT size will typically be 128 points. The magnitude of the FFT bins is then calculated, and expressed either in dBs or, preferably, in a less singular scale such as $$Y(t,k)=|X(t,k)|^{1/4}$$

where X(t, k) is the complex value of the Th FFT bin at frame t. This scale has the advantage of compressing the magnitude (as dbs do), while being defined at zero.

The magnitude in each bin is then compared with the magnitude in the preceding frame at the same frequency bin, and a sum over all FFT bins of "rectified difference" computed as:

$$S(t)=\sum_{K=0}^{NFFT/2}\max(0,Y(t,k)-Y(t-1,k))$$

In other words, the level signal S(t) is the sum over all FFT bins of the rectified discrete differentiation of Y (m; t): where only an increase in the magnitude is of interest.

Smoothing and Transient Detection

The level signal S(t) is still too fast-varying to be processed as is, and some low-pass filtering may be performed before transients can be detected. Although IIR filtering was tested for that purpose, it was found that FIR filtering gives better results, as it offers a better smoothing while not perturbing the time-domain aspect of the level signal S(t), which is very important for the subsequent peak-detection stages. At 22 kHz, a Hanning window of length L=15 is used to smooth S(t), which means that the results of 15 consecutive Fourier analyses are used to obtain the smoothed level signal:

$$S_s(t)=\sum_{i=-L/2}^{i=L/2-1}g_iS(t-i)$$

where $g_i$ is the smoothing window.

Figure 2A:
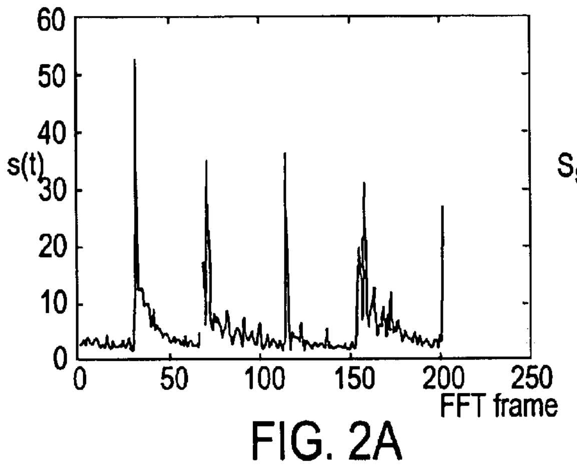
FIGS. 2A and B are graphs respectively depicting the level signal before and after smoothing.
Figure 2B:
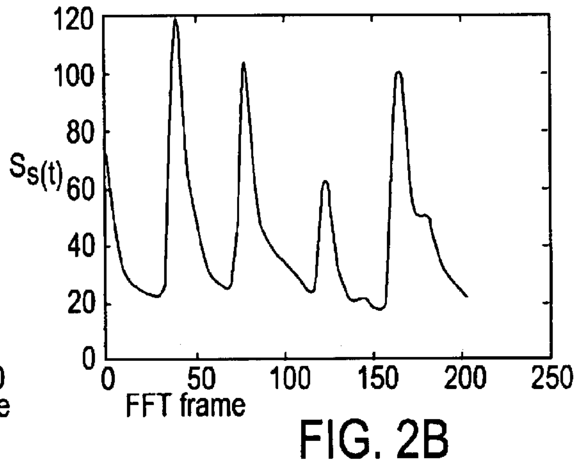

FIGS. 2A and B show the level signal before (2A) and after (2B) the smoothing stage. Finally, a peak-detection algorithm is used to detect maxima on the smoothed level signal $S_s(t)$. A peak is acknowledged only if the adjacent valleys in $S_s(t)$ is low enough with an adjustable threshold. The location of the peaks, corrected by the group delay of the smoothing window, yields the position of the detected transient.

Figure 3:
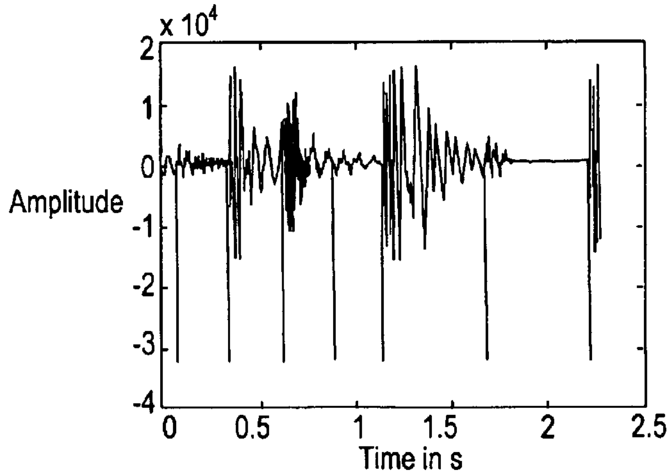
FIG. 3 depicts the transients detected on a actual signal.

FIG. 3 shows the result of a transient analysis on a drum track at 44 KHz. The signal was downsampled by two, and the smoothing involved a 15 point Hanning window. The example shows that transients which are not clearly visible on the waveform (but indeed exist) are well-detected by the algorithm.

Figure 4:
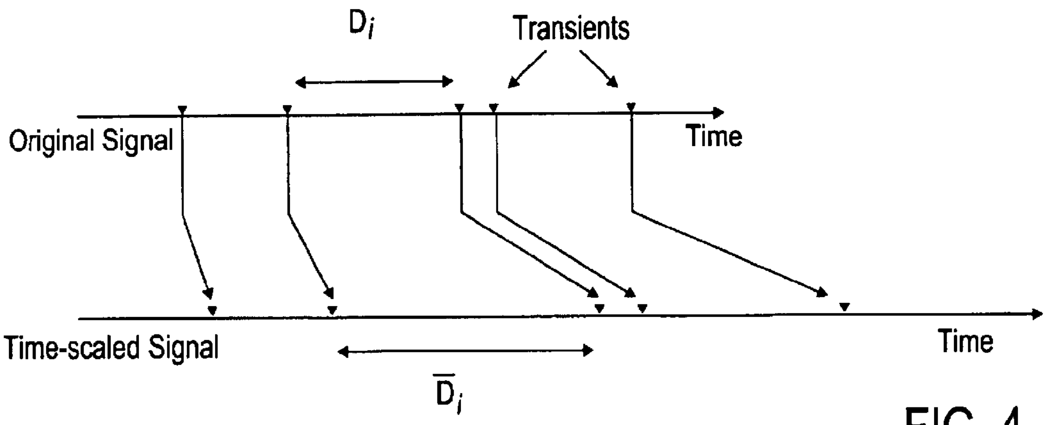
FIG. 4 is a schematic diagram depicting a transient-based time-scaling process.

FIG. 4 depicts the approach used in a preferred embodiment to implement transient-based time scaling. The problems of tempo-modulation and transient-doubling/discarding described above can be eliminated entirely by observing that the tempo between transients is not very well defined, and therefore can be modulated, but the transients themselves should be left untouched, and should fall exactly at their ideal place in the output signal. If the transients have been identified and located in a preceding transient-detection stage, such as described above, the following procedure is utilized to make sure the time-scaling operation meets the above criteria. The signals located between consecutive transients are processed independently, one by one. Starting at transient i located at time $n_i$ (the beginning of the signal, at time 0, can be thought of as an additional fake transient such that $n_0=0$, and $n_i$ is the time expressed in sample time units), the signal up to the next transient time $n_{i+1}$ is processed, either by a time-domain or a frequency-domain time-scaling technique. FIG. 4 depicts the relation between the location of the transients in the input signal and their location in the time-scaled output signal. In FIG. 4, transients are indicated by the triangles, and their exact desired location in the time-scaled signal are shown.

Figure 5:
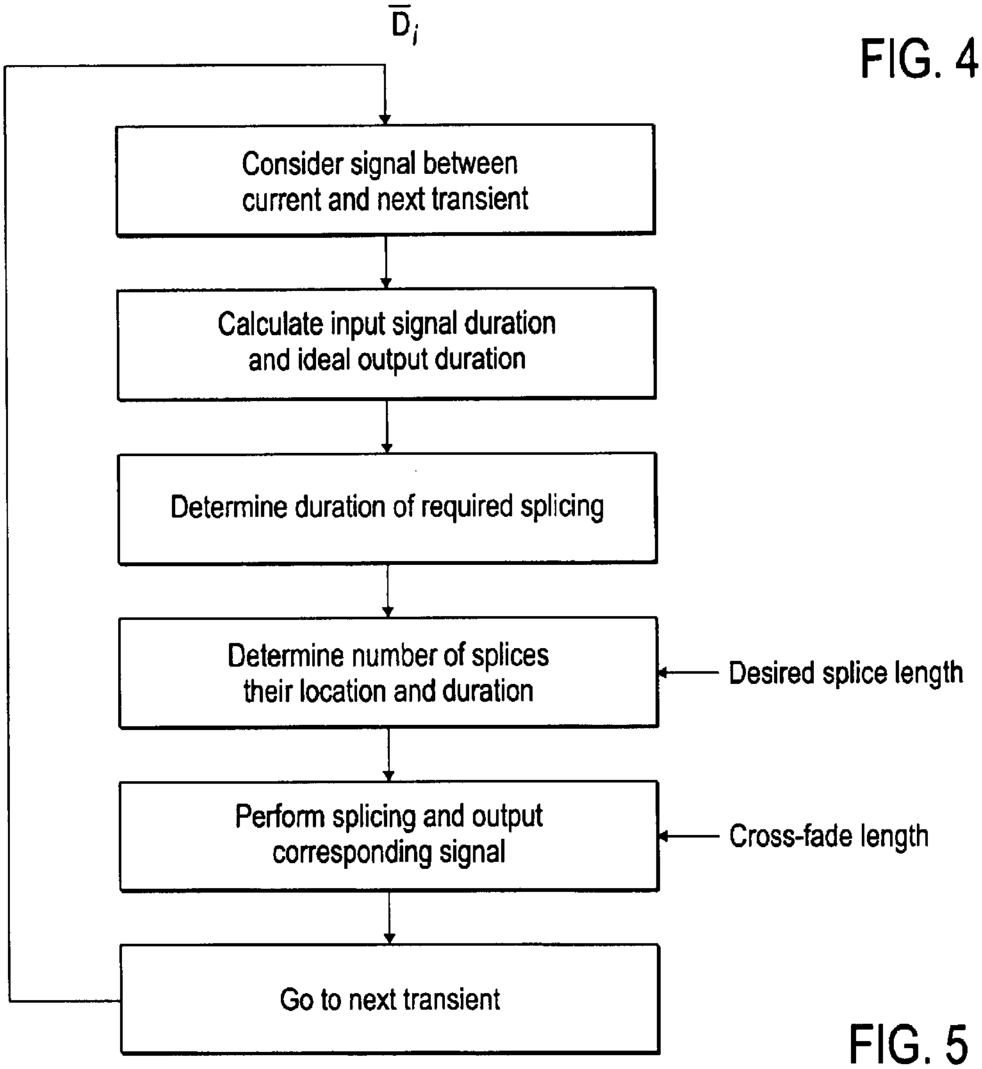
FIG. 5 is a flow chart depicting the steps preformed by a transient-based time-domain time scaling process.

For a time-domain transient-synchronous time-scaling technique, the algorithm is represented in FIG. 5. The various operations are described below.

For a time-domain transient-synchronous time-scaling technique, the algorithm is as follows:

Based on the actual duration of this signal $D_i = n_{i+l} - n_i$ and the ideal duration of the processed corresponding signal $\hat{D}_i = \alpha_i D_i$ (where $\alpha_i$ is the modification factor in frame i), the total duration of the segments needed to splice into $\hat{D}_i - D_i$ can be estimated. In the case of time-stretching, $\hat{D}_i > D_i$ and $L = \hat{D}_i - D_i$ seconds of the input signal must be repeated. When time-compressing, $L = |\hat{D}_i - D_i|$ seconds of input signal must be discarded.

From the above step, it is necessary to either add or discard L samples in the current frame i. This will be done in successive repeat/discard operations, which will each add or discard a fraction of L, such that the total number of repeated/discarded samples will be exactly L.

There are two ways this can be done. This simplest way is to have the user determine a desired splice length S (a user-input parameter to the algorithm), in which case the total number of samples L to be repeated/discarded will be divided into a series of repeat/discard operations of length as close to S as possible: The number $N_i$ of splices that need to occur can be determined, and the average length $\hat{S}$ of each splice is: $N_i = \text{int}[|\hat{D}_i - D_i|/S]$ (where int[x] denotes the integer closest to x), and $\hat{S} = |\hat{D}_i - D_i|/N_i$ A more computation-expensive way consists of letting the algorithm determine an optimal splice length S from the measure of the local periodicity in the signal, as suggested in U.S. patent application Ser. No. 08/745,929 "Time-Domain Time/Pitch Scaling of Speech or Audio Signal, with Transient Handling" which is hereby incorporated by reference for all purposes.

In that case, S may not be a submultiple of L. We then calculate the number $N_i$ of splices that need to occur, $N_i = \text{intb}[L/S]$ where intb[x] is the integer immediately below x. $N_i$ splice operations of length S will then be performed, followed if necessary by a last splice operation of length: $L - N_i S$, which ensures that the total number of repeated/discarded samples is indeed L.

A protected area is defined around the locations of each transient. The protected area typically extends about 1 ms left of the transient and 2 to 3 ms right of it, to account for the fact that the decay of transients is usually longer than their attack. No overlap-add splicing operation is allowed to occur in these protected areas.

Figure 6:
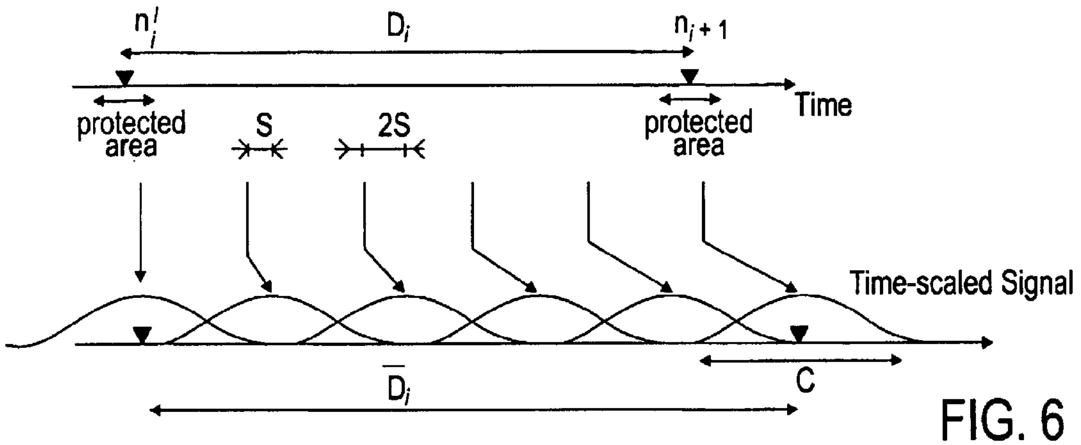
FIG. 6 is a schematic diagram depicting the splicing steps of the time-scaling process.

The $N_i$ splices are then distributed in the interval $n_i \rightarrow n_{i+1}$ and the output signal is calculated between $n_i$ and $n_{i+l}$ by repeatedly performing the $N_i$ splice operations at the desired locations, as shown in FIG. 6. As depicted in FIG. 6, time-stretching is performed by overlap-adding windowed segments of the original signal. The length of the window is the cross-fade length C. In the output signal, the distance between windowed segments is larger than in the input signal, which yields an output signal of longer duration, $\hat{D}_i > D_i$. Not that the "protected area" around the transients only appear in one window, which ensures the transient will not be doubled.

The algorithm then proceeds to the next transient. The end of the signal can also be treated as an additional transient, which ensures the total duration of the modified signal will be exactly a times the total duration of the input signal.

Figure 7:
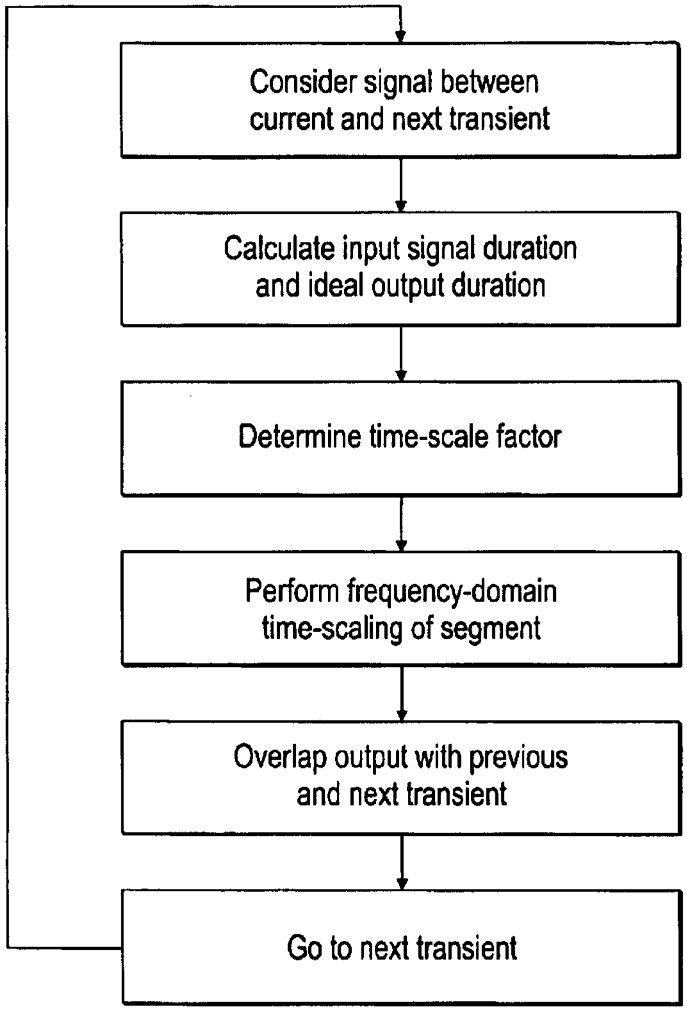
FIG. 7 is a flow chart depicting the steps preformed by a transient-based frequency-domain time scaling process.

FIG. 7 depicts the steps for performing frequency-domain time-scaling of an audio signal.

A protected area is defined around the locations of each transient. The protected area typically extends about $t_i^{l=}1$ ms to the left of the transient and $t_{ir=}2$ to 3 ms right of it, to account for the fact that the decay of transients is usually longer than their attack.

Based on the actual duration of this signal $D_i = n_{i+1} - n_i$ and the ideal duration of the processed corresponding signal $\hat{D}_i = \alpha_i D_i$ (where $\alpha_i$ is the modification factor in frame i), and taking into account that the protected areas are not processed, we can determine a local modification factor:

$$\hat{\alpha} = \frac{\hat{D}_i - (t_{i+1}^l + t_i^r)}{D_i - (t_{i+1}^l + t_i^r)}$$

Figure 8:
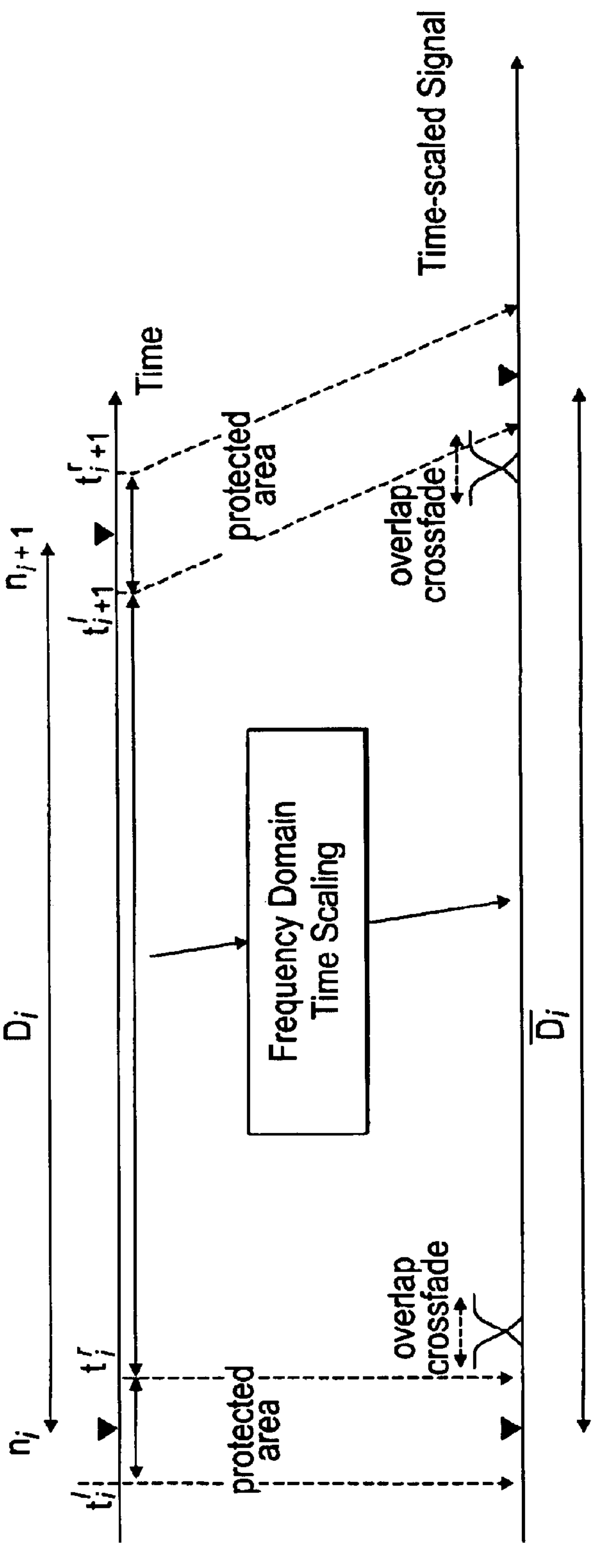
FIG. 8 is a schematic diagram of transient-synchronous frequency domain time-stretching.

The sub-segment between $t_i^r$ and $t_{i+l}^l$ is time-scaled using a frequency-domain time-scaling technique, with a modification factor $\hat{\alpha}$. Such a technique is described in patent application Ser. No. 08/745,955 entitled "System for Fourier Transform-Based Modification of Audio" which is hereby incorporated by reference for all purposes. Note that the protected areas are subtracted from the intervals to calculate $\hat{\alpha}$. This ensures that transients i+1 in the time-scaled signal will fall exactly at the correct location if transient i did. As depicted in FIG. 8, the time-scaled sub-segment is then overlap-added, with the unmodified protected areas to yield the time-scaled segment corresponding to the original signal between $n_i$ and $n_{i+l}$.

Figure 9:
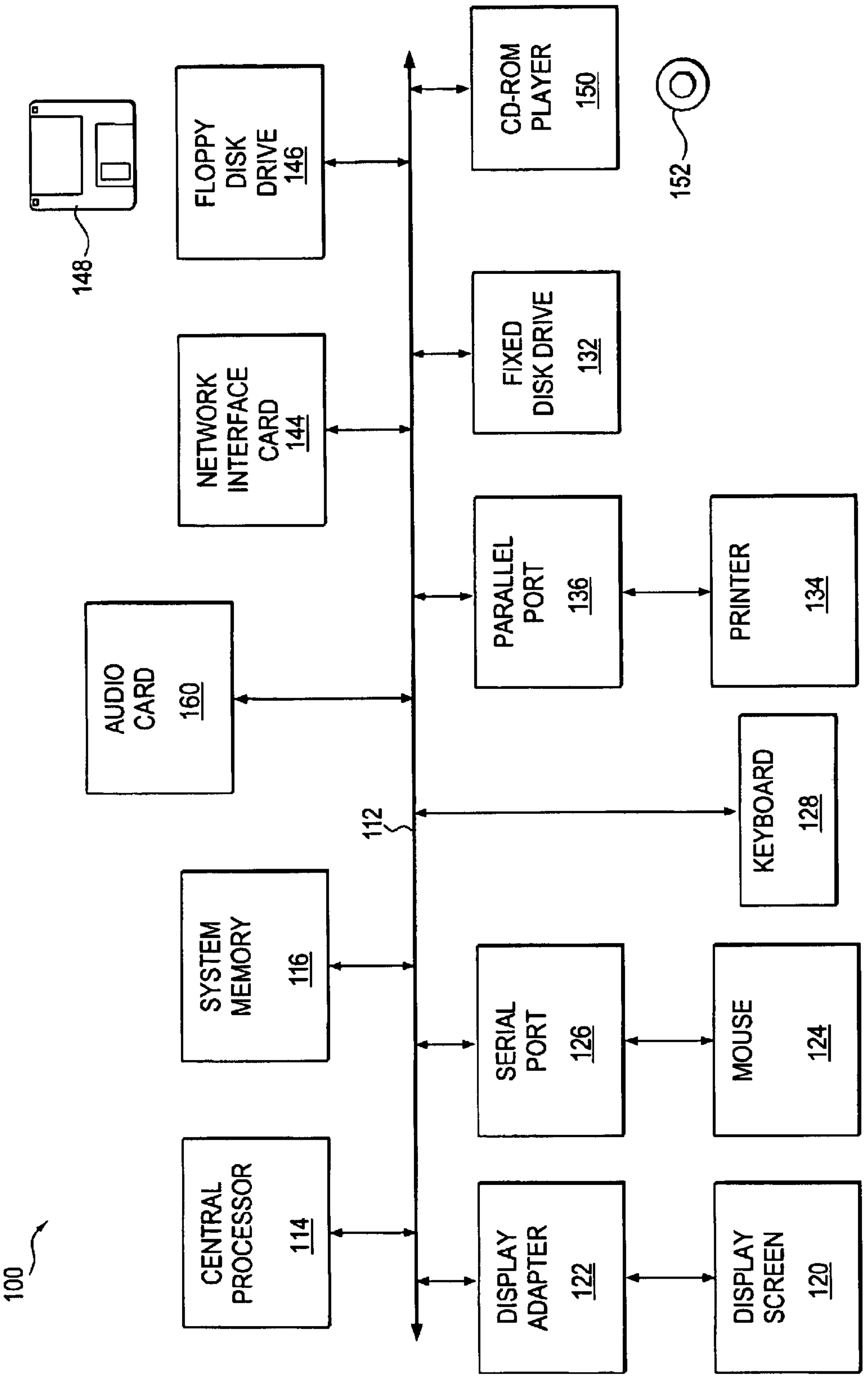
FIG. 9 is a block diagram of a computer system implementing transient detection and/or time stretching on a digital representation of an audio signal.

FIG. 9 shows the basic subsystems of a computer system 100 suitable for implementing some embodiments of the invention. In FIG. 9, computer system 100 includes a bus 112 that interconnects major subsystems such as a central processor 114 and a system memory 116. Bus 112 further interconnects other devices such as a display screen 120 via a display adapter 122, a mouse 124 via a serial port 126, a keyboard 128, a fixed disk drive 132, a printer 134 via a parallel port 136, a network interface card 144, a floppy disk drive 146 operative to receive a floppy disk 148, a CD-ROM drive 150 operative to receive a CD-ROM 152, and an audio card 160 which may be coupled to a speaker (not shown) to provide audio output. Source code to implement some embodiments of the invention may be operatively disposed in system memory 116, located in a subsystem that couples to bus 112 (e.g., audio card 160), or stored on storage media such as fixed disk drive 132, floppy disk 148, or CD-ROM 152.

Many other devices or subsystems (not shown) can be also be coupled to bus 112, such as an audio decoder, a sound card, and others. Also, it is not necessary for all of the devices shown in FIG. 9 to be present to practice the present invention. Moreover, the devices and subsystems may be interconnected in different configurations than that shown in FIG. 9. The operation of a computer system such as that shown in FIG. 1 is readily known in the art and is not discussed in detail herein.

Bus 112 can be implemented in various manners. For example, bus 112 can be implemented as a local bus, a serial bus, a parallel port, or an expansion bus (e.g., ADB, SCSI, ISA, EISA, MCA, NuBus, PCI, or other bus architectures). Bus 112 provides high data transfer capability (i.e., through multiple parallel data lines). System memory 116 can be a random-access memory (RAM), a dynamic RAM (DRAM), a read-only-memory (ROM), or other memory technologies.

In a preferred embodiment the audio file is stored in digital form and stored on the hard disk drive or a CD ROM and loaded into memory for processing. The CPU executes program code loaded into memory from, for example, the hard drive and processes the digital audio file to perform transient detection and time scaling as described above. When the transient detection process is performed the transient locations may be stored as a table of integers representing to transient times in units of sample times measured from a reference point, e.g., the beginning of a sound sample. The time scaling process utilizes the transient times as described above. The time scaled files may be stored as new files.

The invention has now been described with reference to the preferred embodiments. Alternatives and substitutions will now be apparent to persons of skill in the art. The above processes may be performed on audio files stored in any format. Various splicing techniques can be utilized to alter the length of segments between transients while remaining within the scope of the invention. Accordingly, it is not intended to limit the invention except as provided by the appended claims.

What is claimed is:

1. A method for determining the location of transients in a sampled audio signal, said method comprising:

breaking said sampled audio signal into a series of time windows at a series of time points;

determining the frequency energy characteristics of each window;

determining energy curve values at time points of windows having frequency characteristics increased in magnitude from frequency energy characteristics of an preceding window;

low-pass filtering the energy curve values to provide a smoothed energy curve; and selecting maxima of the smoothed energy curve as transient points of the sampled audio signal.

2. A method of time scaling a sampled audio signal, said method comprising:

locating the transients of the sampled audio signal;

protecting an interval about each transient so that time scaling is performed only on non-transient frames of the sampled audio signal located between transients; and changing the duration of the non-transient frames by repeating or deleting portions of the non-transient frame.

3. The method of claim 2 where said locating the transients comprises:

breaking said sampled audio signal into a series of time windows at a series of time points;

determining the frequency energy characteristics of each window;

determining energy curve values at time points of windows having frequency characteristics increased in magnitude from frequency energy characteristics of an immediately preceding window; and selecting times points at peaks of the energy curve as transient points of the sampled audio signal, and where for a selected non-transient frame of the audio signal having a time duration of T seconds, changing the duration comprises:

determining a modification factor for the selected non-transient frame with the product of T with the modification factor being the modified duration of the selected non-transient frame; and splicing segments of the selected non-transient frame into the non-transient frame to change the duration of the selected non-transient frame to the modified duration.

4. A method for changing the duration of an audio signal from a time T to a time T1, said method comprising:

locating transient times identifying times when a transient occurs in the audio signal, with each transient time bracketed by preceding and following protected areas; and for an audio signal interval between a current and next transient:

calculating the duration of the audio signal interval;

calculating the duration of an ideal modified interval;

determining a modified time-scale factor to compensate for the shortening of the audio signal interval due to the protected areas bracketing the transients;

performing frequency domain time scaling based on the modified time- scale factor to modify the length of the interval between the protected areas to form a time-scaled interval; and overlapping the time-scaled interval with the current and next transients.

5. The method of claim 4 comprising:

for a preceding protected area of a first duration and a following protected area of a second duration around each transient;

subtracting the second duration following the current transient and the first duration preceding the next transient from the duration of the audio signal interval and the duration of an ideal modified interval to form a compensated audio signal interval and an ideal modified interval respectively; and calculating a modification factor equal to the ratio of the compensated ideal modified interval to the compensated audio signal interval.

6. The method of claim 5 comprising:

multiplying the compensated audio signal interval by the modification interval to determine the actual duration of a time-scaled audio signal to be inserted between the left protected area of the initial transient and right protected area of the next transient.

7. A method for determining the location of transients in a sampled audio signal having a predetermined time duration, said method comprising:

breaking said sampled audio signal into a series of time windows at a series of time values;

performing a fast Fourier transform (FFT) on each time window to obtain a set of frequency bins for each time window;

summing the positive differences between bins of preceding and following time windows at the same frequencies to determine values of a rectified level signal;

filtering the rectified level signal to form a filtered level signal; and locating transients at peaks of the filtered level signal.

8. A computer product comprising:

a computer usable medium having computer readable program code embodied therein for directing operation of a data processor, said computer readable program code including:

computer readable program code executed by said data processor to protect an interval about each transient so that time scaling is performed only on non-transient frames of the sampled audio signal located between transients;

computer readable program code executed by said data processor to change the duration of the non-transient frames by repeating or deleting portions of the non-transient frame; and for a selected non-transient frame of the audio signal having a time duration of T seconds:

computer readable program code executed by said data processor to determine a modification factor for the selected non-transient frame with the product of T with the modification factor being the modified duration of the selected non-transient frame; and computer readable program code executed by said data processor to splice segments of the selected non-transient frame into the non-transient frame to change the duration of the selected non-transient frame to the modified duration.

9. A system for time-scaling an audio signal, the system comprising:

a central processing unit (CPU);

a memory storing a digital representation of the audio signal and program code for execution by said CPU;

with said CPU executing said program code to:

locate transients of a sampled audio signal;

protect an interval about each transient so that time scaling is performed only on non-transient frames of the sampled audio signal located between transients; and change the duration of the non-transient frames by repeating or deleting portions of the non-transient frame.

10. A method for changing the duration of an audio signal from a time T to a time T1, said method comprising:

locating transient times identifying times when a transient occurs in the audio signal; and for an audio signal interval between a current and a next transient:

calculating a duration of audio signal interval;

calculating a duration of an ideal modified interval;

determining a duration of required splicing;

providing a desired splice length;

based on the desired splice length, determining the number of splices, the location of the splices, and the duration of the splices;

perform splices and outputting a modified audio signal interval.

11. A computer product comprising:

a computer usable medium having computer readable program code embodied therein for directing operation of a data processor to time scale an interval between a current and a next transient in an audio file, said computer readable program code including:

computer readable program code executed by said data processor to calculate the duration of the audio signal interval;

computer readable program code executed by said data processor to calculate the duration of an ideal modified interval;

computer readable program code executed by said data processor to determine a modified time-scale factor to compensate for the shortening of the audio signal interval due to the protected areas bracketing the transients;

computer readable program code executed by said data processor to perform frequency domain time scaling based on the modified time-scale factor to modify the length of the interval between the protected areas to form a time-scaled interval; and computer readable program code executed by said data processor to overlap the time-scaled interval with the current and next transients.

12. A system for time-scaling an audio signal, the system comprising:

a central processing unit (CPU);

a memory storing a digital representation of the audio signal and program code for execution by said CPU;

with said CPU executing said program code to:

locate transients of a sampled audio signal;

protect an interval about each transient so that time scaling is performed only on non-transient frames of the audio signal located between transients; and for an audio signal interval between a current and a next transient:

calculate a duration of the audio signal interval;

calculate a duration of an ideal modified interval;

determine a modified time-scale factor to compensate for shortening of the audio signal interval due to the protected areas bracketing the transients;

perform frequency domain time scaling based on the modified time-scale factor to modify a length of the interval between the protected areas to form a time-scaled interval; and overlap the time-scaled interval with current and next transients.

13. A method of time scaling a sampled audio signal, said method comprising:

locating transients of the sampled audio signal;

performing time scaling on non-transient frames of the sampled audio signal located between transients; and changing a duration of the non-transient frames to time scale the sampled audio signal.

14. A method for determining the location of transients in a sampled audio signal, said method comprising:

breaking said sampled audio signal into a series of time windows at a series of time points;

determining the frequency energy characteristics of each window;

determining energy curve values at time points of windows having frequency characteristics increased in magnitude from frequency energy characteristics of an preceding window;

filtering the energy curve values to provide a filtered energy curve; and selecting points at peaks of the filtered energy curve as transient points of the sampled audio signal.

* * * * *